United States Patent [19]

Hihara et al.

[11] Patent Number: 5,047,085
[45] Date of Patent: Sep. 10, 1991

[54] METHOD OF MAKING STRENGTHENED CELLULAR CONCRETE COMPOSITIONS CONTAINING ALPHA,BETA-UNSATURATED DICARBOXYLIC ACID

[75] Inventors: Mikio Hihara; Nobuhisa Suzuki, both of Fuji, Japan

[73] Assignee: Nissei Plan, Inc., Fuji, Japan

[21] Appl. No.: 587,729

[22] Filed: Sep. 25, 1990

Related U.S. Application Data

[62] Division of Ser. No. 234,951, Aug. 22, 1988.

[30] Foreign Application Priority Data

May 25, 1988 [JP] Japan ................................ 63-127852
May 25, 1988 [JP] Japan ................................ 63-127853

[51] Int. Cl.$^5$ .............................................. C04B 7/02
[52] U.S. Cl. ................................... 106/677; 606/682; 606/728
[58] Field of Search ..................... 106/677, 682, 728

[56] References Cited

U.S. PATENT DOCUMENTS

| 2,478,831 | 8/1949 | MacPherson | 106/88 |
| 3,563,777 | 2/1971 | Pratt et al. | 106/88 |
| 3,758,319 | 9/1973 | Ergene | 106/88 |
| 4,057,608 | 11/1977 | Hashimoto et al. | 106/88 |
| 4,204,877 | 5/1980 | Mover et al. | 106/315 |
| 4,209,336 | 6/1980 | Previte | 106/93 |
| 4,325,736 | 4/1982 | Okadort et al. | 521/83 |
| 4,655,979 | 4/1987 | Nakano et al. | 106/88 |
| 4,662,942 | 9/1987 | Koga et al. | 524/5 |
| 4,668,295 | 5/1987 | Bajpai | 524/5 |
| 4,906,298 | 3/1990 | Natsuume et al. | 524/5 |

FOREIGN PATENT DOCUMENTS

| 145394 | 7/1949 | Australia | 106/88 |
| 628725 | 10/1961 | Canada | 106/88 |
| 1331922 | 10/1961 | France | 106/88 |
| 153203 | 5/1964 | U.S.S.R. | 106/88 |
| 2218977 | 11/1989 | United Kingdom . | |
| 8501499 | 4/1985 | World Int. Prop. O. | 106/88 |
| 8501500 | 4/1985 | World Int. Prop. O. | 106/88 |

Primary Examiner—Karl Group
Attorney, Agent, or Firm—Wenderoth, Lind & Ponack

[57] ABSTRACT

A cellular concrete composition containing as a frother polycarboxylic acids or together with alkylene glycols and/or nonionic surface active agents. It is made by mixing a cement paste with a bubbled frother solution containing polycarboxylic acids or together with alkylene glycols and/or nonionic surface active agents, follow by casting the mixture into a form to solidify.

7 Claims, No Drawings

METHOD OF MAKING STRENGTHENED CELLULAR CONCRETE COMPOSITIONS CONTAINING ALPHA,BETA-UNSATURATED DICARBOXYLIC ACID

This is a divisional application of application Ser. No. 07/234,951, filed Aug. 22, 1988, pending.

BACKGROUND OF THE INVENTION

The present invention relates to cellular concrete compositions which are strengthened by addition of polycarboxylic acids, and the method of making such compositions. More particularly the present invention relates to light-weight cellular concrete, the strength of which is improved by addition of polycarboxylic acids such as maleic and fumaric acid or their combined use with alkylene glycols such as ethylene glycol and/or nonionic surface active agents such as polyethylene glycol, and the method, in which cellular concrete is produced by mixing a cement mortar or paste with a bubbled frother solution containing polycarboxylic acids or together with alkylene glycols and/or nonionic surface active agents.

The light weight, heat insulation, fire resistance, and sound insulation of cellular concrete have allowed it to find a definite niche in the field of building materials.

The process for producing cellular concrete is generally divided into two: (1) to make a cement mortar foam in a form after mixing all the ingredients and (2) to mix a cement paste with a bubbled frother solution, followed by casting this cellular concrete paste into a form. The latter method is widely used since it can make it easy to manufacture the desired form of cellular concrete. However, this procedure has a difficulty to control the flow of aerated concrete slurry or to cause defoaming during the mixing.

For this reason, the use of surface active agents or decomposition products of keratin-type proteins as frother have been proposed And also, Japanese Patent Publication No. 61-5673 provides processes in which, cellular concrete is produced by addition of anionic surface-active agents during or just after mixing a cement mortar with a bubbled, high-viscous frother solution. These methods, however, are also unsatisfactory since they do not give cellular concrete manufactures having a sufficient mechanical strength.

SUMMARY OF THE INVENTION

In accordance with the present invention, cellular concrete compositions are provided that are strengthened by addition of polycarboxylic acids such as maleic and fumaric acid or their combined use with alkylene glycol and/or nonionic surface-active agents such as polyethylene glycol, and methods of making such compositions, with excellent properties, as compared with the conventional frothers or methods which are provided by Japanese Patent Publication No. 61-5673.

Exemplary polycarboxylic acids include maleic acid, fumaric acid, itaconic acid, succinic acid, oxalic acid, tartaric acid, sebacic acid, malonic acid, phthalic acid, terephthalic acid, trimellic acid, and pyromellic acid. Exemplary alkylene glycols include ethylene glycol, propylene glycol, and butylene glycol. Exemplary nonionic surface-active agents include polyethylene glycol, polyethylene glycol alkyl ether, polypropylene alkyl ether, polyethylene glycol fatty acid ester, sorbitan fatty acid ester, and fatty acid monoglyceride.

Cellular concrete compositions of the present invention are manufactured by mixing a cement paste with a bubbled frother solution containing polycarboxylic acids or together with alkylene glycols and/or nonionic surface active agents.

In this case, aggregates such as sand and silica may be used in combination with cement. And also, hydraulic cement such as Portland or alumina cement is commonly used.

In addition, other conventional additives for cellular concrete, such as thickeners, water reducing agents, other surface active agents, and binders can be employed.

The following Examples are illustrative.

EXAMPLE 1

Production of cellular concrete manufacture containing maleic and fumaric acid and ethylene glycol Into 3600 g of Portland cement ( Nippon Cement ) was added 2000 ml of water and the mixture was agitated to form a cement paste. In the meantime, 5 g of maleic acid and 3 g of fumaric acid and 2 g of ethylene glycol were dissolved in 190 ml of water. The mixture was aerated by a bubble generator, to form a frother solution. The above cement paste and frother solution were mixed and agitated to form a cellular concrete slurry. The slurry was casted into a form. The concrete in the form was allowed to stand for 28 days at room temperature. The resultant cellular concrete manufacture was taken out from the form and cut in the form of $4 \times 4 \times 16$ cm$^3$ plate. The found specific gravity of the product was 0.58, giving an indication that the content of blowhole was 66.5 vol%.

The following examples represent preferred embodiments of cellular concrete compositions in accordance with the invention.

EXAMPLE 2

Cellular concrete compositions were prepared using frothers of the invention and two of the prior art, and having the following formulation:

| Ingredients | Parts by Weight |
| --- | --- |
| Portland cement (Nippon Cement) | 3600 |
| Water | 2190 (2000 ml for cement paste and 190 ml for frother solution) |
| Frother | 10 |

TABLE 1

| Example No. | Frother |
| --- | --- |
| Control 1 | Polyvalent metal salt of synthetic high polymer (Pafoam EPM-I, Kao Sekken) |
| Control 2 | Decomposition product of Keratin-type protein (Foamix CII: Hamano Kogyo) |
| Example 1 | maleic acid |
| Example 2 | maleic acid and fumaric acid (7:3 by weight) |
| Example 3 | maleic acid and fumaric acid and ethylene glycol (5:3:2 by weight) |
| Example 4 | maleic acid and fumaric acid and polyethylene glycol (5:3:2 by weight) |
| Example 5 | maleic acid and fumaric acid and ethylene glycol and polyethylene glycol (5:3:1:1 by weight) |

Cellular concrete manufactures containing frothers shown in Table 1 were produced in the same manner as described in Example 1. The aeration of the frother solution was regulated to make the specific gravity of the final product to be 0.58±0.02, which corresponds to 66.5±2.3 vol% of blowhole. Plates of 4×4×16 cm³ were cut off and subjected to mechanical strength tests. The results are shown in Tables 2 and 3.

TABLE 2

| Example No. | Compressive strength (kg/cm²) | Coefficient of contraction ($\times 10^{-4}$) |
|---|---|---|
| Control 1 | 16 | 18 |
| Control 2 | 16 | 18 |
| Example 1 | 20 | 13 |
| Example 2 | 21 | 12 |
| Example 3 | 22 | 11 |
| Example 4 | 22 | 11 |
| Example 5 | 23 | 10 |

TABLE 3

| Example No. | Young's modulas ($\times 10^{-4}$) | flexural strength (kg/cm²) |
|---|---|---|
| Control 1 | 0.8 | 1 |
| Control 2 | 0.8 | 2 |
| Example 1 | 1.4 | 3 |
| Example 2 | 1.4 | 4 |
| Example 3 | 1.5 | 4 |
| Example 4 | 1.5 | 4 |
| Example 5 | 1.6 | 5 |

The improvement when using the frother of the invention as compared with the Controls is evident from the above data.

Since many embodiments of the invention may be made without departing from the spirit and scope thereof, it is to be understood that the invention is not limited by the specific examples except to the defined in the following claims.

What is claimed is:

1. A process for making a cellular concrete composition having improved mechanical strength, consisting essentially of the steps of preparing a cement paste consisting essentially of a hydraulic cement and water, mixing the cement paste with a bubbled frother solution containing at least one alpha, beta-unsaturated dicarboxylic acid, and casting the mixture into a form to solidity.

2. The process according to claim 1, in which the alpha, beta-unsaturated acid is maleic acid.

3. The process according to claim 1, in which the alpha, beta-unsaturated acid is fumaric acid.

4. The process according to claim 1, in which the bubbled frother solution contains an alkylene glycol.

5. The process according to claim 4, in which the alkylene glycol is ethylene glycol.

6. The process according to claim 1, in which the bubbled frother solution contains a nonionic surface-active agent.

7. The process according to claim 6, in which the nonionic surface-active agent is polyethylene glycol.

* * * * *